June 5, 1951  C. USCHMANN ET AL  2,555,382
PANEL SCARFING MACHINE
Filed Oct. 1, 1945  3 Sheets-Sheet 1
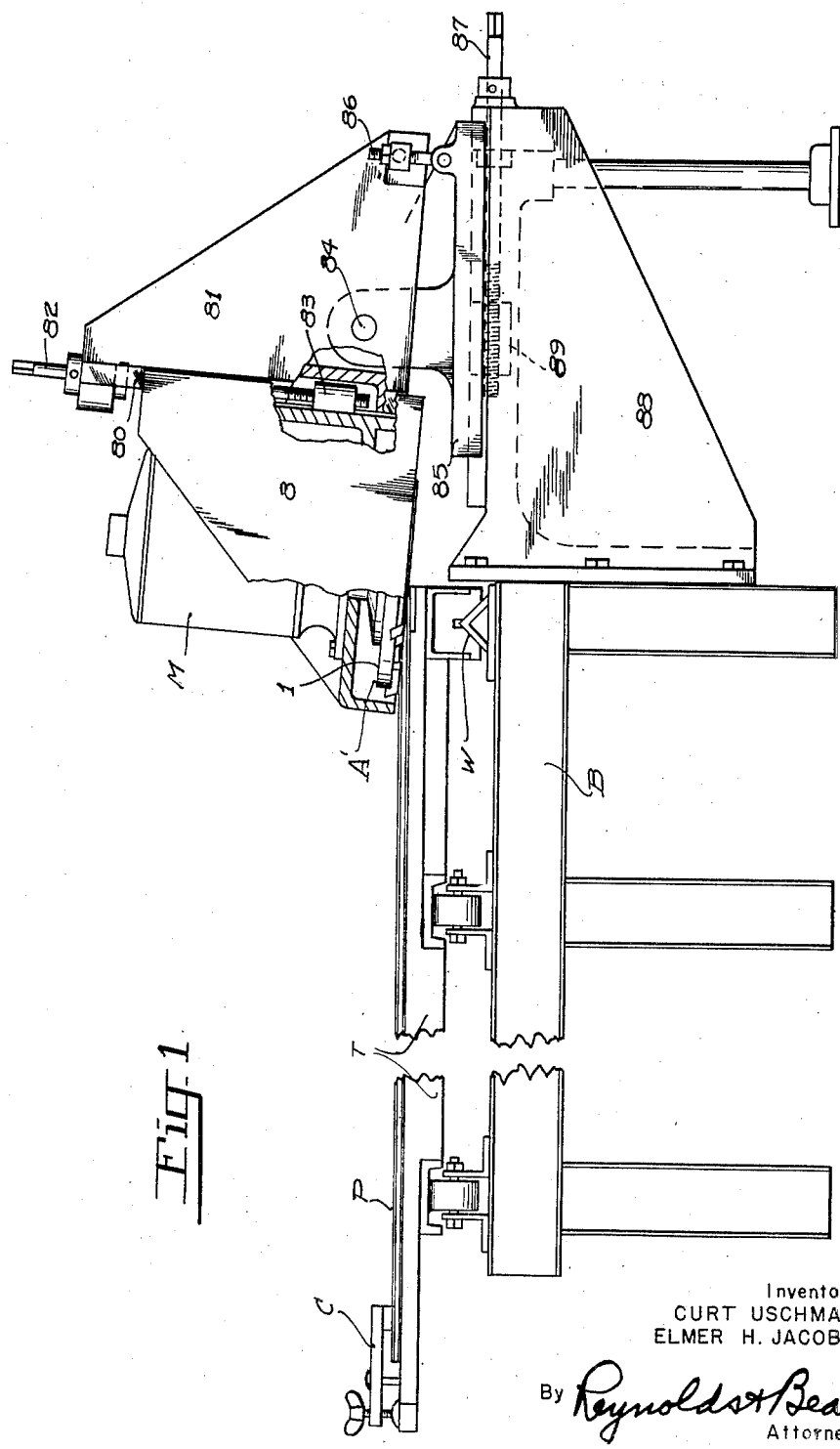
Inventors
CURT USCHMANN
ELMER H. JACOBSON
By Reynolds+Beach
Attorneys

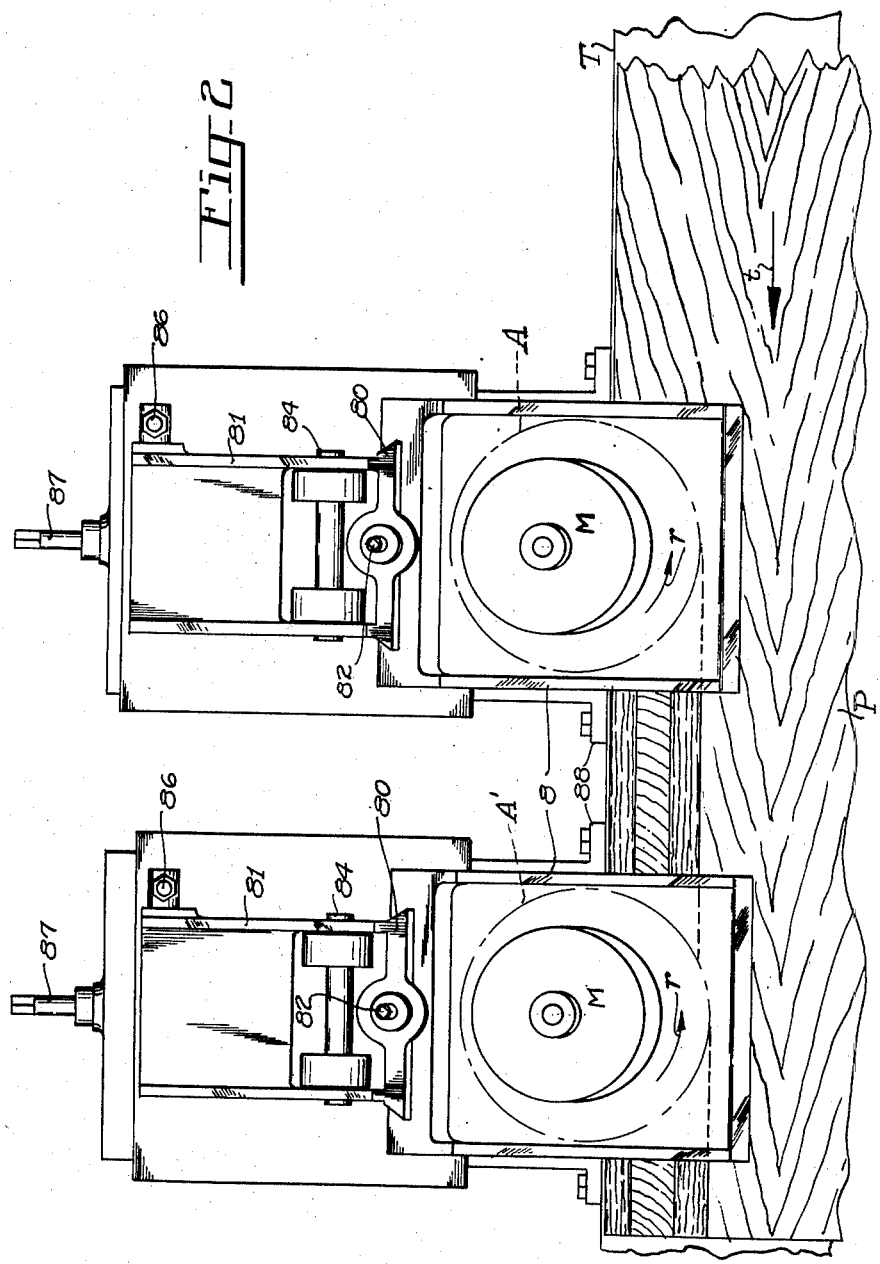

June 5, 1951
C. USCHMANN ET AL
2,555,382
PANEL SCARFING MACHINE
Filed Oct. 1, 1945
3 Sheets-Sheet 3
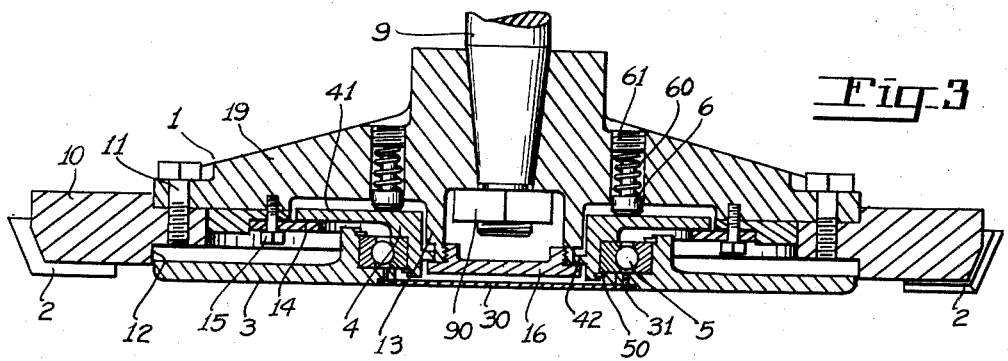
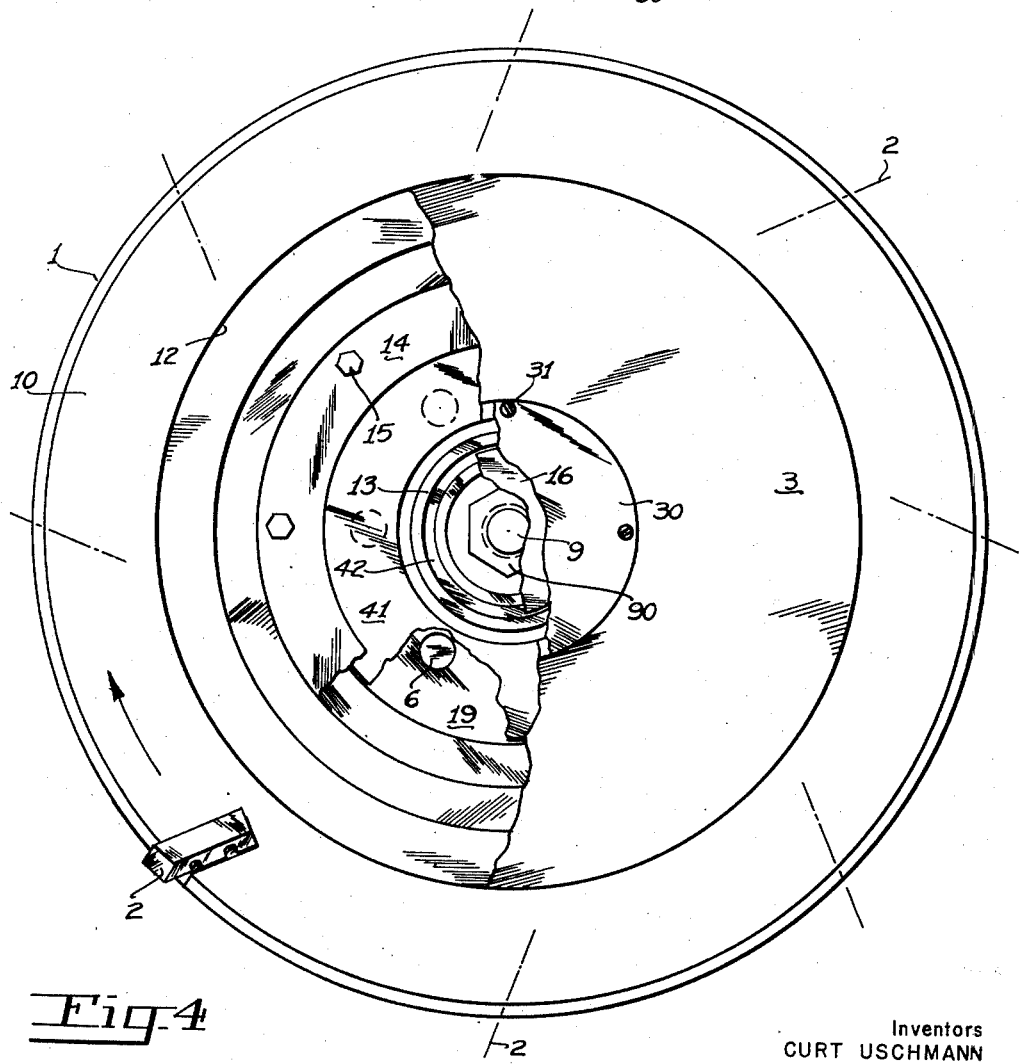
Inventors
CURT USCHMANN
ELMER H. JACOBSON
By Reynolds Beach
Attorneys Patented June 5, 1951

2,555,382

UNITED STATES PATENT OFFICE 2,555,382

PANEL SCARFING MACHINE

Curt Uschmann and Elmer H. Jacobson, Lebanon, Oreg., assignors to Cascades Plywood Corporation, Portland, Oreg., a corporation of Delaware Application October 1, 1945, Serial No. 619,670

6 Claims. (Cl. 144—118)

Large or oversize plywood panels are frequently made by joining together smaller panels in edge-to-edge relationship, usually by a scarf joint. The scarfing might, of course, be applied to panels other than of plywood. Although in many instances plywood panels are joined in end-to-end relationship, the joints running perpendicular to the grain of the surface plies, such panels are also joined in side-by-side relationship, and the invention is illustrated in connection with such latter type of fabrication.

The scarfing of such panels has normally been accomplished by means of a cutter head the rotative axis of which is inclined with respect to the plane of the panel, and which axis is generally parallel to the scarfed surface. An example is found in the patent to Bailey, No. 2,252,112, of August 12, 1941. In other words, the cutter head heretofore has been normally a side cutting cutter head, with the knives projecting generally radially from its cylindrical surface. It has been discovered, however, that such scarfed surfaces may be cut more accurately and smoothly by employing an end cutting cutter head, wherein the knives protrude from the end face of a disk rotative about an axis which is generally perpendicular to the scarfed surface. This is true, however, only if the panel, which is of appreciable width and length, can be adequately and properly held down during the traverse of the cutter head across the edge of the panel.

Because of the inclination of the cutter head with respect to the plane of the panel, and because that inclination may vary in different jobs, it has been difficult heretofore to devise suitable means which would hold down the panel and prevent its vibration. Engagement of holding mechanism directly with the scarfed surface is the most satisfactory and accurate expedient for holding down the panel during the scarf jointing operation, but this is not as readily accomplished if the hold-down means precedes or follows the cutter head, for the scarfed surface only comes into being as the cutter head operates. We have devised hold-down means which may be located close to the cutting knives at their cutting location, and at the same time may press directly against the scarfed surface itself, before the knives which formed it have wholly passed on, to effect the most direct and immediate control, and thus to enable the scarfing to be accomplished most smoothly and accurately, and without tendency of the panel to vibrate. Even though the hold-down means contacts the panel over only a small area it will function satisfactorily for our purpose, simply because it does engage the scarfed surface itself, within the circle of operation of the knives whereby it is surfaced.

With our machine the smoothness of the cut and its accuracy can be improved by removing the material in increments, a part only of the scarf being cut, or the scarf being cut only to a part of its final depth, by one cutter head, a following cutter head completing the scarfing operation. Presser means engageable with the panel surface, but not the scarfed surface, does not act closely enough to hold down firmly, yet a presser which attempts to engage one or the other of the preliminarily scarfed surface or the finally scarfed surface is inadequate to hold firmly the other such scarfed surface. The provision of a machine which can make such successive cuts in a single pass, yet which will incorporate adequate hold-down means for the respective cutter heads, even though the depth or angle of cut may not be the same for each cutter head, is an object of this invention.

It is a further object of the invention to enable the cutter heads of a machine for accomplishing such scarfing operations to be adjusted for altering the bevel angle of the scarf, and also for varying individually their location perpendicular to the panel being scarfed and also parallel to such panel in a direction perpendicular to its edge to be jointed, and which, by any such adjustment of either cutter head, will entail automatically corresponding adjustment of the hold-down means associated with the respective cutter heads.

It is also an object of the invention, by such adjustments, to locate each cutter head so that, having regard to the direction of relative traverse of the cutter head and panel, and to the direction of rotation of the cutter head, its knives cut from a panel face toward the edge of the panel, thus reducing the likelihood of splintering the wood.

With these and other objects in mind, as will appear hereafter, and particularly such objects as deal with the mechanical features of the machine as a whole, this invention comprises the novel parts and the novel combination and arrangement thereof, as shown in the accompanying drawings, described in the specification, and as will be more particularly defined by the claims which terminate the specification.

In the accompanying drawings the invention is shown in a form which at present is the preferred form.

Figure 1 is in general a side elevational view of the scarfing machine as a whole, parts, however, being broken away and shown in section to illustrate hidden structure.

Figure 2 is a top plan view of the scarfing cutter heads and their immediate supports, showing the manner in which they cooperate with one another in scarfing a panel.

Figure 3 is an axial section through the cutter head, showing details of its construction and assembly.

Figure 4 is a bottom plan view, with parts broken back, to show the interior construction of the cutter head.

The machine as a whole may incorporate two cutter heads designated, in Figure 2, A and A', respectively, which are substantially identical in their construction, supported in suitable adjustable mounts, and rotated by motors M in the direction of the arrows $r$. A carriage or table T, supporting the panel P, is itself supported upon a bed B, which in the particular example illustrated is horizontal, and is guided by ways W for edgewise movement with respect to the cutter heads, which in such arrangement would be stationary, though individually adjustable in position. The travel of such carriage is in the direction of the arrow $t$ shown in Figure 2. It will be evident, of course, that the arrangement might be reversed and the panel P, which is secured upon the shiftable table T by suitable clamps C, might be stationary, and the cutter heads might traverse the edge of the panel.

Each of the cutter heads A and A' is supported upon a standard or conventional arbor 9 (Figures 3 and 4), which may be the shaft of its motor M. In general each cutter head comprises a disklike element 1 rigidly secured upon the arbor by means such as the nut 90. Since the carriage T is horizontal the arbors 9 are arranged generally upright, being inclined with respect to the vertical just sufficiently to produce the desired angle of scarf on the panel P. The important point is that such arbors are generally perpendicular to the panel being jointed. In order that the angle between each arbor and the carriage may be adjusted to vary the bevel angle of the scarf, and that the location of the cutter heads may be adjusted with respect to each other and with respect to the edge of the panel, each motor is mounted in a bracket 8. This bracket is guided by a guide 80 for substantially vertical adjustment relative to a tiltable frame 81 toward or away from the carriage T. This vertical adjustment may be effected by a screw 82 and nut 83, the nut being carried upon the bracket 8, and the screw 82 being journaled in the frame 81. Such frame 81 is tiltably supported by pivot 84 upon a platform 85, and the tilting of the assembly is governed by a screw adjustment 86 or a similar device. Adjustment generally parallel to the panel in a direction perpendicular to its edge to be jointed is accomplished by a horizontal screw 87 carried in the main frame member 88 which is supported from the bed B. Such screw 87 cooperates with a nut 89 carried by the platform 85. As will be evident, the adjusting means described are merely typical and other means to the same end may be employed.

Such adjustments enable variation of the scarfing angle, and proper positioning of each cutter head relative to the work after any tilting adjustment; also, they enable relative adjustment of the respective cutter heads so that the leading cutter head A takes off a portion of the panel corner, and the succeeding cutter head B completes the cut. The first cutter head may cut to substantially the final depth along one edge or the other of the scarf over part only of its width, and the second cutter head remove material to widen the scarf to its final width, or the first cutter may take a rough cut both in width and depth, allowing the second cutter to finish the scarf in both dimensions. It will be noted in Figure 2 that the cutter heads are so adjusted that the upper edges of the cuts are generally tangent to the respective cutter heads, and so that the inrunning knives cut always into the panel face, downwardly in the particular instance illustrated, and toward the edge of the panel P.

Notwithstanding that each of the two successive cutter heads will be adjusted for a different depth of cut, and that each may be differently adjusted as to angle of scarfing, the panel must be pressed and held down by presser means associated as closely as possible with the cutting knives. Direct association with each cutter head of a presser disk 3 within the circle of knives, adjustable automatically as and to the same extent that each cutter head is adjusted, and yieldably urged axially away from the end face of the cutter head disk, affords a solution to the problem of holding down the work, but introduces new problems peculiar to such a mechanical arrangement. For instance, since the cutter head disk 1 must be suitable for mounting upon and ready dismounting from a standard arbor 9, all presser means and associated parts must be carried by the cutter head disk 1 itself. Relative axial movement between the presser means and the cutter head whereupon it is mounted is essential, and since the presser means should not rotate in contact with the scarfed surface, relative rotational movement between the cutter head disk and the presser means is highly desirable, in order that the presser means may remain rotatively stationary while the cutter head rotates at high speed. A high speed bearing which will absorb axial thrust as well as permit rotation should therefore be interposed between the presser means and the cutter head disk, within the quite restricted space available, and additionally space must be left for the required axial movement of the presser means and its bearing means. All this, with the rotative knives immediately adjacent the non-rotative and axially movable presser disk, and close to the bearing means, involves the necessity of protecting the bearing from entrance of chips, dust, and the like, and of preventing entrance of such foreign matter into the space whereinto the presser disk must move in yielding axially. The provisions whereby such diverse ends are attained constitute probably the most important part of this invention. The disk-like element 1, for convenience of manufacture and assembly, is made up of two parts, of which the inner part 19 is secured directly upon the arbor 9 by nut 90 in conventional fashion, and the outer annular part 10 is secured to the member 19 by means such as the bolts 11 interconnecting the inner periphery of such latter part and the overlapping outer periphery of the former part. The composite disk-like element 1, and in particular the peripheral ring 10, supports knives 2 extending generally radially of it, but preferably inclined slightly to locate their outer ends in advance of their inner ends in the direction of disk rotation (Figure 4). The sides of these knives project beyond the end face of the disk, and both the radially outer ends and such projecting sides are sharpened to form cutting edges. Mainly the cutting is accomplished by the sharpened sides. The manner of securing these knives in place, their construction, and their placement, may be conventional.

The member 1 is formed with a central recess 12 just inside the circle of knives. Within this recess is received the presser disk 3, which, however, may have its central portion cut out and completed by a thin plate 30 secured to such disk by the screws 31. The member 19 may be provided with a central boss 13 projecting into the recess 12. A collar 4 rather closely encircling such boss, constitutes a support and guide for the disk 3. An antifriction bearing 5 is interposed between them to enable them to rotate relatively, and preferably also transmits axial thrust to and from the presser disk 3. This bearing is preferably removably secured to both of these members by such means as snap rings 50 received in grooves formed in the disk 3 and collar 4.

The collar 4 is urged axially away from disk 19 by suitable presser means, which in this instance consists of several plungers 6 spaced circumferentially about the rotative axis of disk 19 and received in apertures spaced in such disk. These plungers are urged outwardly by springs 60 backed by adjusting screws 61 threaded in the disk apertures, by which the tension of the springs may be adjusted. These plungers bear upon the collar 4, or upon a flange 41 which may be formed on the inner edge of the collar extending radially outwardly from it. A stop ring 14 is secured to the disk 1 by screws 15 in a position spaced from its inner surface a distance substantially greater than the thickness of flange 41, and its inner periphery laps the outer edge of such flange and is engageable by it to limit axial movement of the collar 4 away from the disk, and to prevent protrusion of the disk 3 wholly outside the recess 12. A like result may be obtained either alternatively or additionally, by an annular rib 42 encircling the inner periphery of the collar in a position to bear upon the flange of a cap 16 threaded into the end of the boss 13, and serving also to enclose the disk-securing nut 90.

The resilient pressure of plungers 6 on the collar 4 away from disk 1 also urges the disk 3 axially outward by reason of the transmission of pressure through bearing 5. Conversely the pressure of the panel P against the disk 3 reacts through the bearing to urge the collar 4 inwardly against the pressure of plungers 6. Nevertheless the collar and disk 3 are freely rotative relatively, so that although the friction between such disk and the panel may retard or stop its rotation, rotation of the cutter head ring 10 will not be retarded.

When a cutter head so constructed is brought into engagement with the work P, and the cutter head and the work are traversed relatively, the inrunning knives effect the scarfing cut, and are immediately followed, in the direction of travel $t$, by the presser or hold-down disk 3. This disk is urged outwardly slightly beyond the plane of the sharpened sides of cutting knives 2 when they are not cutting, and therefore it bears upon the freshly scarfed surface with sufficient pressure to hold firmly against the carriage the portion of the panel edge immediately behind the knives which are actually cutting, and yet with a gentle pressure. The pressure will normally be sufficient that the friction of disk 3 with the panel will substantially overcome the tendency of such disk to rotate, even though the cutter head is rotating at high speed. The bearing 5, however, eliminates all appreciable rotative drag on the cutter head and yet permits the presser disk 3 to be pressed firmly against the panel while remaining more or less stationary (in the rotational sense) as it traverses the scarfed edge. The snug fit of the presser disk 3 within its recess 12 prevents entrance of foreign matter behind the disk 3.

If it is necessary to disassemble the cutter head and presser element, it is a simple matter to remove the cover 30, and then to remove the retaining rings 50, which secure the bearing 5 in the collar 4, or, by removal of the cap 16 and by removal, through a register hole in the disk 3 (not shown), of the screws 15 securing ring 14 to disk 19, the collar 4 may be readily removed. Simply by removal of the cover 30 and cap 16 access is had to the nut 90 for separation of the disk 1 from shaft 9 to remove the cutter head with its presser disk as a unit from the arbor.

We claim as our invention:

1. A surfacing tool, comprising a disk-like head recessed centrally in one face, and having the peripheral portion of this face arranged as a working surface to define the finished surface of the work, a collar located within the recess of, and guided upon, said head for axial movement, a presser disk received within said recess, radial and thrust bearing means mounting said disk upon said collar, yieldable means urging said collar and presser disk axially outwardly of said recess, to press the presser disk into engagement with the finished surface of the work, a flange on said collar, and a retainer ring mounted upon said head, within its recess, and engageable with said flange to limit protrusion of said presser disk from said recess.

2. A surfacing tool, comprising a disk-like head recessed centrally in one face, and having the peripheral portion of this face arranged as a working surface to define the finished surface of the work, a collar located within the recess of, and guided upon, said head for axial movement, a presser disk received within said recess, radial and thrust bearing means mounting said disk upon said collar, the head having a plurality of angularly spaced, axially disposed apertures, yieldable means comprising spring-pressed plungers received in said apertures and bearing upon said collar to urge said collar and presser disk axially outwardly of said recess, thereby to press the presser disk into engagement with the finished surface of the work, and a backing plug in the outer end of each aperture, adjustable therein to vary the axial pressure of its plunger.

3. A scarfing tool comprising a disk-like cutter head having knives arranged about a peripheral circle and projecting from the end face of the cutter head to define the general plane of the scarfed surface, means to secure said head upon an arbor for rotation thereby, said cutter head end face having therein an end-opening recess formed centrally within the circle of knives, a presser disk received within said recess and fitting into the same with a sufficient clearance at their overlapping side walls for free relative rotation and axial movement thereof, but spaced closely enough to prevent appreciable infiltrations of shavings, rotative bearing means received in said recess, such bearing means including a stationary element guided in said recess for axial movement on said head, and a cooperable rotative element carrying and guiding said presser disk for free rotation and axial movement on said head, stop means carried by said head, within said recess, and operable to limit outward axial displacement of said presser disk at a position thereof short of complete discontinuance of its overlap with the recess wall, in which position the disk projects beyond said general plane defined by the knives, and resilient presser means carried by said head and engageable with said bearing means stationary element at a plurality of angularly spaced locations thereon to urge said stationary element, hence said rotative element and said presser disk, outwardly from said recess.

4. The scarfing tool defined in claim 3, and adjustment means cooperating with the resilient presser means and operable thereby to vary independently the resilient pressure exerted on the bearing means stationary element at the different angularly spaced locations thereon, respectively.

5. The scarfing tool defined in claim 4, in which the resilient presser means comprises a plurality of helical springs and cooperating plungers carried by the head at their respective angularly spaced locations therein, to exert resilient force on the bearing stationary element at such locations.

6. The scarfing tool defined in claim 3, wherein the presser disk has a central opening therein communicating with the recess in the head, and a cover for said opening to seal said recess against infiltrations of shavings, yet detachable for access to the bearing means and securing means behind the presser disk.

CURT USCHMANN.
ELMER H. JACOBSON.

REFERENCES CITED

The following references are of record in the file of this patent:

UNITED STATES PATENTS

| Number | Name | Date |
|---|---|---|
| Re. 444 | Woodbury | Mar. 31, 1857 |
| 327,189 | Norris | Sept. 29, 1885 |
| 387,757 | Baillie | Aug. 14, 1888 |
| 513,192 | Marsh | Jan. 23, 1894 |
| 676,957 | Meyer | June 25, 1901 |
| 895,401 | Hamilton et al. | Aug. 4, 1908 |
| 1,365,660 | Collier | Jan. 18, 1921 |
| 1,817,049 | Weil | Aug. 4, 1931 |
| 2,252,112 | Bailey | Aug. 12, 1941 |

FOREIGN PATENTS

| Number | Country | Date |
|---|---|---|
| 1,175 | Great Britain | Mar. 29, 1873 |
| 203,570 | Great Britain | Sept. 13, 1923 |